(12) United States Patent
Sakai et al.

(10) Patent No.: US 6,306,918 B1
(45) Date of Patent: Oct. 23, 2001

(54) SEMI-RIGID POLYURETHANE FOAM

(75) Inventors: Mitsuru Sakai; Atsushi Ishikawa; Masayoshi Morii, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/386,138

(22) Filed: Aug. 31, 1999

(30) Foreign Application Priority Data

Mar. 9, 1999 (JP) .................................................. 11-062056

(51) Int. Cl.[7] ....................................................... C08J 9/04
(52) U.S. Cl. ......................... 521/129; 521/118; 521/155; 521/167; 521/174
(58) Field of Search .................................. 521/155, 118, 521/129, 174, 167

(56) References Cited

U.S. PATENT DOCUMENTS

| 4,026,840 | 5/1977 | Bechara et al. . |
| 4,438,235 | 3/1984 | Brizgys . |
| 4,714,719 | 12/1987 | Yamasaki et al. . |
| 5,374,666 | * 12/1994 | Tamano et al. ..................... 521/118 |
| 5,624,968 | * 4/1997 | Gabbard ............................. 521/107 |
| 5,856,678 | * 1/1999 | Smits et al. ........................ 521/112 |

FOREIGN PATENT DOCUMENTS

| 5714762 | 3/1982 | (JP) . |
| 8143637A | 6/1996 | (JP) . |
| 8217847A | 8/1996 | (JP) . |

* cited by examiner

Primary Examiner—John M. Cooney, Jr.
(74) Attorney, Agent, or Firm—Birch, Stewart, Kolasch & Birch, LLP

(57) ABSTRACT

A semi-rigid polyurethane foam having a strength retention of not less than 70% when allowing it to stand at 120° C. for 24 hours, and a Haze value of not more than 2 as determined by Fogging test, prepared by mixing a polyol mixture comprising a polyol, water and a catalyst with a polyisocyanate, and foaming the resulting mixture, and a process for preparing the same. The semi-rigid polyurethane foam would not cause fogging under high-temperature conditions, and can be suitably used for interior materials of automobiles such as headrests and armrests.

7 Claims, No Drawings

SEMI-RIGID POLYURETHANE FOAM

BACKGROUND OF THE INVENTION

1. Field of the Invention

The present invention relates to a semi-rigid polyurethane foam. More specifically, the present invention relates to a semi-rigid polyurethane foam which can be suitably used for interior materials of automobiles such as headrests and armrests, particularly headrests which are produced by high-speed foam molding with surface material.

2. Discussion of the Related Art

Semi-rigid polyurethane foams have appropriate impact absorptivity, elasticity and compression recovery. Therefore, the foams have been used for interior materials of automobiles as disclosed in Japanese Patent Laid-Open Nos. Hei 8-143637 and Hei 8-217847.

When the semi-rigid polyurethane foams are used for the interior materials of automobiles, however, there may arise a clouding phenomenon on the window glass of automobiles, so-called "fogging" due to an amine catalyst used in the preparation of the semi-rigid polyurethane foam at the time the room temperature inside the automobile becomes high.

An object of the present invention is to provide a semi-rigid polyurethane foam which would not cause fogging under high-temperature conditions, and which can be suitably used for interior materials of automobiles.

This and other objects of t he present invention will be apparent from the following description.

SUMMARY OF THE INVENTION

The present invention pertains to the following:

[1] a semi-rigid polyurethane foam having a strength retention of not less than 70% when allowing it to stand at 120° C. for 24 hours, and a Haze value of not more than 2 as determined by Fogging test, prepared by mixing a polyol mixture comprising a polyol, water and a catalyst with a polyisocyanate, and foaming the resulting mixture; and

[2] a process for preparing a semi-rigid polyurethane foam having a strength retention of not less than 70% when allowing it to stand at 120° C. for 24 hours, and a Haze value of not more than 2 as determined by Fogging test, comprising mixing a polyol mixture comprising 100 parts by weight of a polyol, 2 to 8 parts by weight of water, and 0.5 to 6 parts by weight of a catalyst with a polyisocyanate, and foaming the resulting mixture.

DETAILED DESCRIPTION OF THE INVENTION

The term "strength retention when allowing it to stand at 120° C. for 24 hours" mentioned in the present specification refers to a value obtained by allowing a produced semi-rigid polyurethane foam to stand at room temperature for 24 hours, thereafter cutting out 10 test pieces from the semi-rigid polyurethane foam for "No. 2 tensile test" prescribed in JIS K 6301obtaining an average value of strength (initial strength) when subjecting 5 test pieces to a tensile test at room temperature at a tensile speed of 125 mm/min with a tensile tester [autograph commercially available from Shimadzu Corporation under Article No. DCS-50M], also obtaining an average value of strength (high-temperature strength) when allowing the remaining 5 test pieces to stand in an atmosphere of 120° C. for 24 hours, thereafter subjecting the remaining 5 test pieces to a tensile test in the same manner as above, and calculating the strength retention according to the following equation:

[Strength Retention (%)]=[High-Temperature Strength]/[Initial Strength]×100

When the semi-rigid polyurethane foam has a strength retention of not less than 70%, the semi-rigid polyurethane foam can be suitably used for interior materials of automobiles. Also, from the viewpoint of preventing the lowering of foam strength in accordance with the passage of time, it is preferable that the strength retention is not less than 80%.

The term "Haze value as determined by Fogging test" mentioned in the present specification refers to a value obtained by allowing the produced semi-rigid polyurethane foam to stand at room temperature for one day, thereafter cutting out a test piece (50 mm×50 mm×100 mm) from its core portion, placing this test piece in a 500 ml-glass bottle charged with 0.1 ml of 2 N hydrochloric acid, sealing the aperture with a transparent glass plate, immersing about two-third of this glass bottle in a water bath kept at 80° C. for 100 hours, thereafter measuring the Haze value of the glass plate with a Hazemeter (color difference meter) commercially available from Nippon Denshoku Kogyo Kabushiki Kaisha under Article No. NDH-20D. The smaller the Haze value is, the lower the degree of cloudiness is.

The semi-rigid polyurethane foam of the present invention has a Haze value of not more than 2. Accordingly, the foam exhibits some excellent effects such that no fogging is generated on the window glass when the foam is used as interior materials of automobiles and allowed to stand under high temperatures in a sealed space such as inner space of automobiles. The Haze value is not more than 2, preferably not more than 1, from the viewpoint of preventing fogging.

It is desired that the foam density (hereinafter referred to as "core density") of the semi-rigid polyurethane foam is 25 to 100 kg/m$^3$, preferably 30 to 80 kg/m$^3$, from the viewpoints of foam strength, cushioning property, and light weight.

The semi-rigid polyurethane foam can be prepared by mixing a polyol mixture comprising a polyol, water and a catalyst with a polyisocyanate, and foaming the resulting mixture.

The polyol includes polyester-polyols, polyether-polyols, and the like. It is desired that the average hydroxyl value of the polyol is 14 to 100 mg KOH/g, preferably 17 to 75 mg KOH/g, more preferably 17 to 70 mg KOH/g, from the viewpoints of viscosity and imparting elasticity to the foam.

The dicarboxylic acid which can be used in the polyester-polyol includes saturated aliphatic dicarboxylic acids such as glutaric acid, adipic acid, pimelic acid, suberic acid, azelaic acid and sebacic acid; saturated alicyclic dicarboxylic acids such as cyclohexanedicarboxylic acid; aromatic dicarboxylic acids such as phthalic acid, terephthalic acid and isophthalic acid; unsaturated aliphatic dicarboxylic acids such as maleic acid, fumaric acid and itaconic acid; halogenated dicarboxylic acids such as tetrabromophthalic acid; ester-formable derivatives thereof; acid anhydrides thereof, and the like. Those dicarboxylic acids can be used alone or in admixture thereof. The dicarboxylic acid may contain a tri or more functional polybasic acid, such as trimellitic acid and pyromellitic acid, as occasion demands.

The diol constituting the polyester-polyol includes ethylene glycol, diethylene glycol, propylene glycol, 1,4-butanediol, 1,5-pentanediol, methylpentanediol, 1,6-hexanediol, trimethylolpropane, glycerol, pentaerythritol, diglycerol, dextrose, sorbitol, and the like. Those diols can be used alone or in admixture thereof.

Representative examples of the polyether-polyol include polyoxypropylene polyols (hereinafter referred to as "PPG"); polyoxytetramethylene glycol (hereinafter referred to as "PTMG"), and mixtures thereof. Among them, the PPG to which ethylene oxide is added at its terminal is preferable. The weight ratio of polyoxypropylene/polyoxyethylene of the PPG is preferably 50/50 to 95/5 more preferably 60/40 to 80/20, from the viewpoints of hydrolysis, and reactivity and foam strength.

The PPG can be prepared by a process comprising subjecting a compound having at least two active hydrogens as a starting material to ring-opening addition of a usual alkylene oxide, and further adding ethylene oxide in a block form to its end.

The compound having at least two active hydrogens includes polyhydric alcohols, polyhydric phenols, polyamines, alkanolamines, and the like. Concrete examples thereof include ethylene glycol, diethylene glycol, propylene glycol, dipropylene glycol, neopentyl glycol, 1,4-butanediol, 1,6-hexanediol, glycerol, trimethylolpropane, pentaerythritol, diglycerol, dextrose, sucrose, bisphenol A, ethylenediamine, and modified products thereof, and the like. Those compounds can be used alone or in admixture thereof.

The alkylene oxide includes, for instance, ethylene oxide, propylene oxide, 1,2-butylene oxide, 2,3-butylene oxide, styrene oxide, and the like.

The PTMG can be prepared by ring-opening polymerization of tetrahydrofuran. It is preferable that the PTMG has a number-average molecular weight of not less than 1,000.

The polyol mixture may contain a cell regulator, as occasion demands. The cell regulator may be any of those which are generally used when preparing a polyurethane foam. Examples of the cell regulator are silicone surfactants such as dimethylpolysiloxane and polyoxyalkylene-modified dimethylpolysiloxanes; and anionic surfactants such as salts of fatty acids, salts of sulfuric acid esters, salts of phosphoric acid esters and sulfonates.

The amount of the cell regulator cannot be absolutely determined because it may differ depending upon its kinds and foam density of a desired semi-rigid polyurethane foam. Therefore, it is desired that the amount of the cell regulator is properly adjusted in accordance with the kinds of those cell regulators, and the like. For instance, it is preferable that the cell regulator is used in an amount of 0.2 to 3 parts (parts by weight, hereinafter referred to the same), based on 100 parts of the polyol.

Water is used as a blowing agent. Aside from water, there can be used a blowing agent such as a hydrocarbon having a low-boiling point, such as isopentane, normal-pentane or cyclopentane; a gas such as nitrogen gas, air or carbon dioxide; a hydrochlorofluorocarbon or a hydrofluorocarbon such as HCFC-141b, HFC-134a, HFC-245fa, HFC-245ca, HFC-236ea or HFE-347 within the scope which would not impair the object of the present invention.

The amount of water cannot be absolutely determined because it may differ depending upon the foam density of a desired semi-rigid polyurethane foam. Therefore, it is desired that the amount of water is properly adjusted in accordance with the desired foam density.

It is desirable that the catalyst is an amine catalyst having a primary hydroxyl group in its molecule. The amine catalyst includes a dimethylaminoalkyl alcohol represented by the formula (I):

(CH$_3$)$_2$N—(CH$_2$)$_P$—OH      (1)

wherein p is an integer of 4 to 8; a dimethylaminoalkoxy alcohol, and the like. Those amine catalysts can be used alone or in admixture thereof. Among them, the dimethylaminoalkyl alcohol represented by the formula (I) can be favorably used because it exhibits excellent effects in inhibiting fogging. In addition, there can be used an organometallic compound such as dibutyltin dilaurate, stannous oleate, cobalt naphthenate or lead naphthenate, in combination with the above amine catalyst.

The dimethylaminoalkyl alcohol includes 6-dimethylamino-1-hexanol, 4-dimethylamino-1-butanol, 8-dimethylamino-1-octanol, and the like. The dimethylaminoalkoxy alcohol includes dimethylaminoethoxy ethanol, dimethylaminoethoxyethoxy ethanol, and the like. Among them, 6-dimethylamino-1-hexanol can be favorably used, because 6-dimethylamino-1-hexanol exhibits a high strength retention.

It is desired that the amount of the catalyst is 0.5 to 6 parts, preferably 1 to 4 parts, based on 100 parts of the polyol, from the viewpoints of demoldability, and flowability and formability.

The desirable amount of water is 2 to 8 parts and that of the catalyst is 0.5 to 6 parts, and the more desirable amount of water is 2.5 to 4.5 parts and that of the catalyst is 1 to 4 parts, based on 100 parts of the polyol.

There may be added to the polyol mixture, for instance, a crosslinking agent, a stabilizer, a pigment, and the like in proper amounts.

The crosslinking agent includes a low-molecular weight compound having at least two groups selected from the group consisting of hydroxyl group, primary amino group, secondary amino group, and other groups having active hydrogen capable of reacting with isocyanate group. Examples thereof include polyhydric alcohols such as ethylene glycol, diethylene glycol, propylene glycol, dipropylene glycol, 1,4-butanediol, 1,6-hexanediol, neopentyl glycol, glycerol, trimethylolpropane, triethanolamine, and alkylene oxide adducts of bisphenol A; polyamines such as diethyltoluenediamine, chlorodiaminobenzene, ethylenediamine and 1,6-hexanediamine, and the like. Those crosslinking agents can be used alone or in admixture thereof.

The stabilizer includes hindered phenol radical scavengers such as dibutylhydroxytoluene, pentaerythrityl-tetrakis[3-(3,5-di-t-butyl-4-hydroxyphenyl)propionate] and isooctyl-3-(3,5-di-t-butyl-4-hydroxyphenyl)propionate; antioxidants such as phosphorous acid compounds such as phosphorous acid, triphenylphosphite, triethylphosphite and triphenylphosphine; ultraviolet absorbents such as 2-(5-methyl-2-hydroxyphenyl)benzotriazole and a condensation product of methyl-3-[3-t-butyl-5-(2H-benzotriazol-2-yl)-4-hydroxyphenyl]propionate and polyethylene glycol, and the like. Those stabilizers can be used alone or in admixture thereof. Among those stabilizers, there can be favorably used the phosphorous acid compounds, specifically triphenylphosphite and pentaerythrityl-tetrakis[3-(3,5-di-t-butyl-4-hydroxyphenyl)propionate], from the viewpoint of improvement in foam strength. Particularly, when triphenylphosphite is used together with pentaerythrityl-tetrakis[3-(3,5-di-t-butyl-4-hydroxyphenyl)propionate], there is an advantage that foam strength can be even further enhanced.

The pigment includes inorganic pigments represented by transition metal salts; organic pigments represented by azo compounds; and carbon powder. Those pigments can be used alone or in admixture thereof.

The polyisocyanate includes aromatic polyisocyanates, alicyclic polyisocyanates and aliphatic polyisocyanates, each having at least two isocyanate groups, mixtures thereof, and modified polyisocyanates obtained by modifying the polyisocyanates mentioned above. Concrete examples thereof include aromatic polyisocyanates such as tolylene diisocyanate, methylenediphenyl diisocyanate, naphthylene diisocyanate, xylylene diisocyanate and polymethylenepolyphenylene isocyanate; alicyclic polyisocyanates such as hydrogenated methylenediphenyl diisocyanate, hydrogenated tolylene diisocyanate and isophorone diisocyanate; aliphatic polyisocyanates such as hexamethylene diisocyanate and lysine diisocyanate; mixtures thereof; modified products thereof. The modified products include prepolymer-type modified compounds which are reaction products of a polyisocyanate with a polyol, nurate-modified compounds, urea-modified compounds, carbodiimide-modified compounds, allophanate-modified compounds, biuret-modified compounds, and the like.

The process for preparing a semi-rigid polyurethane foam includes a process comprising mixing a polyol mixture obtained by previously mixing a polyol, water and a catalyst, and other auxiliaries such as a cell regulator as occasion demands, with a polyisocyanate by means of a molding machine; injecting the resulting mixture into a mold; and foaming the mixture. More concretely, the process includes a process comprising mixing a polyol mixture using a tank or the like; adjusting its temperature usually to 20° C. or so; thereafter reacting the polyol mixture with a polyisocyanate compound using a foaming machine such as an automatically mixing and injecting foaming machine or an automatically blending and injecting foaming machine; and foaming the resulting mixture.

It is desired that the ratio of the polyol to the polyisocyanate is adjusted such that the isocyanate index is usually 95 to 110.

As described above, since the semi-rigid polyurethane foam of the present invention has a high strength retention and a low Haze value, it can be suitably used for interior materials of automobiles such as headrests and armrests.

EXAMPLES

Examples 1 to 3 and Comparative Examples 1 to 3

There were mixed 100 parts of a branched polyetherpolyol (average hydroxyl value: 28 mg KOH/g; manufactured by Sumitomo Bayer Urethane K. K. under the trade name of "Sumiphen 3063") being a PPG to which ethylene oxide is added at its terminal, 1.5 parts of triethanolamine, 3.6 parts of water as a blowing agent, and a catalyst and an auxiliary in proportions as shown in Table 1 with a mixer for laboratory, to give a polyol mixture.

The resulting polyol mixture was mixed with a polyisocyanate (manufactured by Sumitomo Bayer Urethane K. K. under the trade name of "Sumidule 44V20") with the mixer for laboratory at 15° C. in proportions such that the isocyanate index was 105. Thereafter, 250 g of the resulting mixture was poured into a mold [inner dimensions: 150 mm (length), 150 mm (width), and 300 mm (height)], to form a free foam of a semi-rigid polyurethane foam.

The strength retention and Haze value of the resulting semi-rigid polyurethane foams were evaluated in accordance with the methods described above. In addition, the foam density was evaluated in accordance with the following method. The results are shown in Table 1.

Foam Density

A free foam of the semi-rigid polyurethane foam is prepared, and allowed to stand for one day. Thereafter, a test piece of a size of 100 mm×100 mm×100 mm is cut out from its core portion. The test piece is weighed. The foam density is calculated by dividing the weight of the test piece by its volume.

TABLE 1

| Example No. | Catalyst (Parts) | Auxiliary (Parts) | | Strength Retention (%) | Haze Value | Core Density of Foam (kg/m³) |
|---|---|---|---|---|---|---|
| 1 | Dimethylaminoethoxy ethanol (3.5) | PETP*¹ Triphenyl Phosphite | (0.2) (0.2) | 75.8 | 0.8 | 52.6 |
| 2 | Dimethylaminoethoxyethoxy ethanol (3.5) | PETP*¹ Triphenyl Phosphite | (0.2) (0.2) | 70.5 | 0.7 | 53.7 |
| 3 | 6-Dimethyamino-1-hexanol (3.5) | — | | 85.9 | 0.2 | 53.2 |
| Comp. Ex. 1 | 33.3% Dipropylene Glycol Solution of Triethylenediamine (3.4) | — | | 103.2 | 15.8 | 52.3 |
| Comp. Ex. 2 | N,N,N',N'-Tetramethylhexanediamine (2.4) | — | | 102.2 | 36.0 | 53.6 |
| Comp. Ex. 3 | Trimethylaminopropylethanolamine (3.5) | — | | 49.0 | 0.7 | 53.1 |

Note *¹: Pentaerythrityl-tetrakis[3-(3,5-di-t-butyl-4-hydroxyphenyl)propionate]

It is clear from the results shown in Table 1 that since the semi-rigid polyurethane foams obtained in Examples 1 to 3 have high strength retentions and extremely small Haze values, they substantially cause no fogging, so that they can be suitably used for interior materials of automobiles.

Since the semi-rigid polyurethane foam of the present invention has appropriate strength without causing fogging even under high-temperature conditions, they are suitably used for interior materials of automobiles.

Those skilled in the art will recognize, or be able to ascertain using no more than routine experimentation, many equivalents to the specific embodiments of the present invention described specifically herein. Such equivalents are intended to be encompassed in the scope of the following claims.

What is claimed is:

1. A semi-rigid polyurethane foam having a strength retention of not less than 70% when allowing it to stand at 120° C. for 24 hours, and a Haze value of not more than 2 as determined by Fogging test, prepared by mixing a polyol mixture comprising a polyol, water and an amine catalyst having a primary hydroxyl group in its molecule with a polyisocyanate, and foaming the resulting mixture;

wherein said amine catalyst is a dimethylaminoalkyl alcohol represented by the following formula (I):

$$(CH_3)_2N-(CH_2)_p-OH \quad (I)$$

wherein p is an integer of 4 to 8.

2. The semi-rigid polyurethane foam according to claim 1, wherein the amount of water is 2 to 8 parts by weight, based on 100 parts by weight of the polyol.

3. The semi-rigid polyurethane foam according to claim 1, wherein the foam has a foam density (core density) of 25 to 100 kg/m³.

4. The semi-rigid polyurethane foam according to claim 1, wherein an average hydroxyl value of the polyol is 14 to 100 mg KOH/g.

5. The semi-rigid polyurethane foam according to claim 1, wherein the polyol is a polyoxypropylene polyol to which ethylene oxide is added at its terminal.

6. The semi-rigid polyurethane foam according to claim 5, wherein the weight ratio of polyoxypropylene/polyoxyethylene in the polyoxypropylene polyol is 50/50 to 95/5.

7. A process for preparing a semi-rigid polyurethane foam having a strength retention of not less than 70% when allowing it to stand at 120° C. for 24 hours, and a Haze value of not more than 2 as determined by Fogging test, comprising mixing a polyol mixture comprising 100 parts by weight of a polyol, 2 to 8 parts by weight of water, and 0.5 to 6 parts by weight of an amine catalyst having a primary hydroxyl group in its molecule with a polyisocyanate, and foaming the resulting mixture;

wherein said amine catalyst is a dimethylaminoalkyl alcohol represented by the following formula (I):

$$(CH_3)_2N-(CH_2)_p-OH \quad (I)$$

wherein p is an integer of 4 to 8.

* * * * *